United States Patent
Behroozi et al.

(10) Patent No.: US 9,590,721 B2
(45) Date of Patent: *Mar. 7, 2017

(54) SYSTEMS AND METHODS FOR USING DIFFERENT BEAM WIDTHS FOR COMMUNICATIONS BETWEEN BALLOONS

(71) Applicant: X Development LLC, Mountain View, CA (US)

(72) Inventors: Cyrus Behroozi, Mountain View, CA (US); Eric Krenz, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/046,715

(22) Filed: Feb. 18, 2016

(65) Prior Publication Data

US 2016/0204849 A1    Jul. 14, 2016

Related U.S. Application Data

(63) Continuation of application No. 14/133,216, filed on Dec. 18, 2013, now Pat. No. 9,300,388.

(51) Int. Cl.
*H04W 84/06*    (2009.01)
*H04B 7/185*    (2006.01)
*H04W 72/04*    (2009.01)

(52) U.S. Cl.
CPC ..... *H04B 7/18504* (2013.01); *H04B 7/18506* (2013.01); *H04W 72/046* (2013.01)

(58) Field of Classification Search
CPC ........... H04B 7/18504; H04B 7/18506; H04W 72/046

USPC .......... 455/11.1, 12.1, 13.3, 115.1, 562, 560, 455/269, 272, 507, 562.1, 446, 501, 3.01, 455/3.02, 561, 67.11, 424; 342/372, 368, 342/371, 357, 352, 357.17, 357.14; 701/3, 301; 700/245; 370/252, 328; 343/112; 367/103, 124

See application file for complete search history.

(56) References Cited

U.S. PATENT DOCUMENTS

| | | | | |
|---|---|---|---|---|
| 4,317,119 A | * | 2/1982 | Alvarez | G01S 13/9303 342/455 |
| 4,370,656 A | * | 1/1983 | Frazier | G01S 5/12 342/126 |
| 5,471,218 A | | 11/1995 | Talbot et al. | |
| 5,777,949 A | * | 7/1998 | MacLeod | G01S 3/802 367/124 |
| 6,018,659 A | * | 1/2000 | Ayyagari | H04B 7/18504 342/450 |

(Continued)

*Primary Examiner* — Tan H Trinh
(74) *Attorney, Agent, or Firm* — McDonnell Boehnen Hulbert & Berghoff LLP

(57) ABSTRACT

Example methods and systems for using radio frequency (RF) signals with different beam widths for purposes of balloon-to-balloon communication are described. One example method includes determining a vertical angle between a first balloon and a second balloon, if the vertical angle is below a threshold angle, communicating with the second balloon using a narrow beam RF signal from a communication system of the first balloon, and if the vertical angle is not below the threshold angle, communicating with the second balloon using a wide beam RF signal from the communication system of the first balloon.

17 Claims, 14 Drawing Sheets

(56) References Cited

U.S. PATENT DOCUMENTS

| | | | |
|---|---|---|---|
| 6,128,469 | A | 10/2000 | Zenick et al. |
| 6,184,828 | B1 | 2/2001 | Shoki |
| 6,347,234 | B1 | 2/2002 | Scherzer |
| 6,369,755 | B1 | 4/2002 | Nichols et al. |
| 6,453,177 | B1* | 9/2002 | Wong .................. H01Q 1/246 455/450 |
| 6,725,013 | B1* | 4/2004 | Chang ............... H04B 7/18508 342/354 |
| 6,727,849 | B1 | 4/2004 | Kirk et al. |
| 6,992,622 | B1* | 1/2006 | Chiang ................... H01Q 3/40 342/373 |
| 8,116,763 | B1 | 2/2012 | Olsen |
| 8,160,831 | B1 | 4/2012 | Rausch et al. |
| 9,075,074 | B2* | 7/2015 | Fischenberg ........... G01P 5/001 |
| 9,281,554 | B1* | 3/2016 | Behroozi ................ H01Q 1/28 |
| 9,300,388 | B1* | 3/2016 | Behroozi ........... H04B 7/18504 |
| 9,391,368 | B2* | 7/2016 | Clevorn .................. H01Q 3/34 |
| 2002/0068613 | A1* | 6/2002 | Miyano ................ H01Q 1/246 455/562.1 |
| 2002/0164946 | A1 | 11/2002 | Olsen et al. |
| 2002/0167702 | A1 | 11/2002 | Badesha et al. |
| 2003/0008611 | A1 | 1/2003 | Forman et al. |
| 2003/0022694 | A1 | 1/2003 | Olsen et al. |
| 2003/0057030 | A1 | 3/2003 | Yumura et al. |
| 2003/0114195 | A1 | 6/2003 | Chitrapu et al. |
| 2005/0007880 | A1* | 1/2005 | Zimmerman ........... G01S 15/89 367/103 |
| 2005/0014499 | A1* | 1/2005 | Knoblach ................. B64B 1/40 455/431 |
| 2005/0272472 | A1 | 12/2005 | Goldberg et al. |
| 2006/0012511 | A1* | 1/2006 | Dooi ....................... G01S 7/02 342/70 |
| 2007/0054617 | A1* | 3/2007 | Nikolajevic ......... H04B 7/0619 455/41.2 |
| 2007/0275664 | A1 | 11/2007 | Uhl |
| 2008/0102814 | A1* | 5/2008 | Chari ..................... H01Q 1/283 455/424 |
| 2010/0214156 | A1* | 8/2010 | Karam ................ G01S 13/4454 342/149 |
| 2010/0305752 | A1* | 12/2010 | Abramson ................ G01S 1/70 700/245 |
| 2011/0034191 | A1 | 2/2011 | Leabman |
| 2011/0100201 | A1 | 5/2011 | Bass |
| 2011/0123028 | A1 | 5/2011 | Karabinis |
| 2012/0140231 | A1 | 6/2012 | Knox et al. |
| 2012/0194399 | A1* | 8/2012 | Bily ....................... H01Q 13/28 343/772 |
| 2012/0200454 | A1* | 8/2012 | Hadinger ........... H04B 7/18508 342/352 |
| 2013/0051302 | A1* | 2/2013 | Kim ..................... H04B 7/0408 370/312 |
| 2013/0179008 | A1* | 7/2013 | DeVaul ................ H04B 10/118 701/3 |
| 2013/0182790 | A1* | 7/2013 | Jalali ...................... H01Q 3/24 375/285 |
| 2013/0230088 | A1 | 9/2013 | Arad et al. |
| 2013/0301455 | A1* | 11/2013 | Jung ................. H04W 72/0406 370/252 |
| 2013/0303218 | A1* | 11/2013 | Teller ................... H04L 47/829 455/507 |
| 2013/0315083 | A1* | 11/2013 | Jung .................... H04B 7/26 370/252 |
| 2014/0004897 | A1* | 1/2014 | Jung ................... H04W 72/082 455/509 |
| 2014/0125511 | A1* | 5/2014 | Longstaff .............. G01S 13/882 342/33 |
| 2014/0139372 | A1* | 5/2014 | Seol ..................... H01Q 3/2605 342/367 |
| 2014/0192917 | A1 | 7/2014 | Nam et al. |
| 2014/0225775 | A1* | 8/2014 | Clevorn .................. H01Q 3/24 342/372 |
| 2014/0249738 | A1* | 9/2014 | Euteneuer ........... G01S 13/9303 701/301 |
| 2014/0333491 | A1* | 11/2014 | Behroozi ............. H01Q 1/1264 343/706 |
| 2015/0061936 | A1 | 3/2015 | Love et al. |
| 2015/0097739 | A1 | 4/2015 | Samuel |
| 2015/0126173 | A1 | 5/2015 | Dribinski et al. |
| 2016/0073393 | A1* | 3/2016 | Kim ................... H04W 72/046 455/509 |
| 2016/0226573 | A1* | 8/2016 | Behroozi ........... H04B 7/18504 |

\* cited by examiner

SYSTEMS AND METHODS FOR USING DIFFERENT BEAM WIDTHS FOR COMMUNICATIONS BETWEEN BALLOONS

CROSS REFERENCE TO RELATED APPLICATION

The present application is a continuation of U.S. patent application Ser. No. 14/133,216 filed on Dec. 18, 2013, the contents of which are incorporated herein by reference, as if fully set forth in this description.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

Example methods and systems for using radio frequency (RF) signals with different beam widths for purposes of balloon-to-balloon communication are described. An example balloon may be capable of transmitting a narrow-beam signal and a wide-beam signal. A threshold angle may be determined for the narrow-beam signal, which may indicate when to use the narrow-beam signal to communicate with a particular target balloon. In order to communicate from one balloon to another balloon, a vertical angle between the two balloons may be determined. If the vertical angle is less than the threshold angle, the narrow-beam signal may be used for communication between the balloons. Otherwise, the wide-beam signal may be used instead.

In one example, a method is provided that includes determining a vertical angle between a first balloon and a second balloon, if the vertical angle is below a threshold angle, communicating with the second balloon using a narrow beam RF signal from a communication system of the first balloon, and if the vertical angle is not below the threshold angle, communicating with the second balloon using a wide beam RF signal from the communication system of the first balloon.

In another example, a balloon is provided that includes an RF communication system capable of transmitting a narrow beam RF signal and a wide beam RF signal, and a control system configured to determine a vertical angle between the balloon and a second balloon, if the vertical angle is below a threshold angle, communicate with the second balloon by transmitting a narrow beam RF signal from the communication system to the second balloon, and if the vertical angle is not below the threshold angle, communicate with the second balloon by transmitting a wide beam RF signal from the communication system to the second balloon.

In still another example, a method is provided that includes determining a vertical angle between a first balloon and a second balloon, determining a corresponding angle range for a plurality of beam widths, where a communication system of the first balloon is capable of transmitting RF signals at the plurality of beam widths, selecting a beam width from the plurality of beam widths such that the vertical angle is within the corresponding angle range of the selected beam width, and communicating with the second balloon using an RF signal with the selected beam width from the communication system of the first balloon.

In a further example, a non-transitory computer readable medium having stored therein instructions that when executed by a computing system, cause the computing system to perform functions is disclosed. The functions may include determining a vertical angle between a first balloon and a second balloon, if the vertical angle is below a threshold angle, communicating with the second balloon using a narrow beam RF signal from a communication system of the first balloon, and if the vertical angle is not below the threshold angle, communicating with the second balloon using a wide beam RF signal from the communication system of the first balloon.

In an additional example, a method is provided that includes determining a position of a second balloon relative to a first balloon, determining respective antenna utilization levels for a higher-gain antenna and a lower-gain antenna located on the first balloon based at least in part on the position of the second balloon relative to the first balloon, where the higher-gain antenna and the lower-gain antenna are connected to a common transceiver, and communicating with the second balloon using the higher-gain antenna and the lower-gain antenna located on the first balloon, where antenna utilization of the higher-gain antenna and the lower-gain antenna for communication with the second balloon is determined based on the antenna utilization levels.

In yet another example, a system may include means for determining a vertical angle between a first balloon and a second balloon, if the vertical angle is below a threshold angle, means for communicating with the second balloon using a narrow beam RF signal from a communication system of the first balloon, and if the vertical angle is not below the threshold angle, means for communicating with the second balloon using a wide beam RF signal from the communication system of the first balloon.

These as well as other aspects, advantages, and alternatives, will become apparent to those of ordinary skill in the art by reading the following detailed description, with reference where appropriate to the accompanying figures.

DETAILED DESCRIPTION

I. Overview

Figure 1:
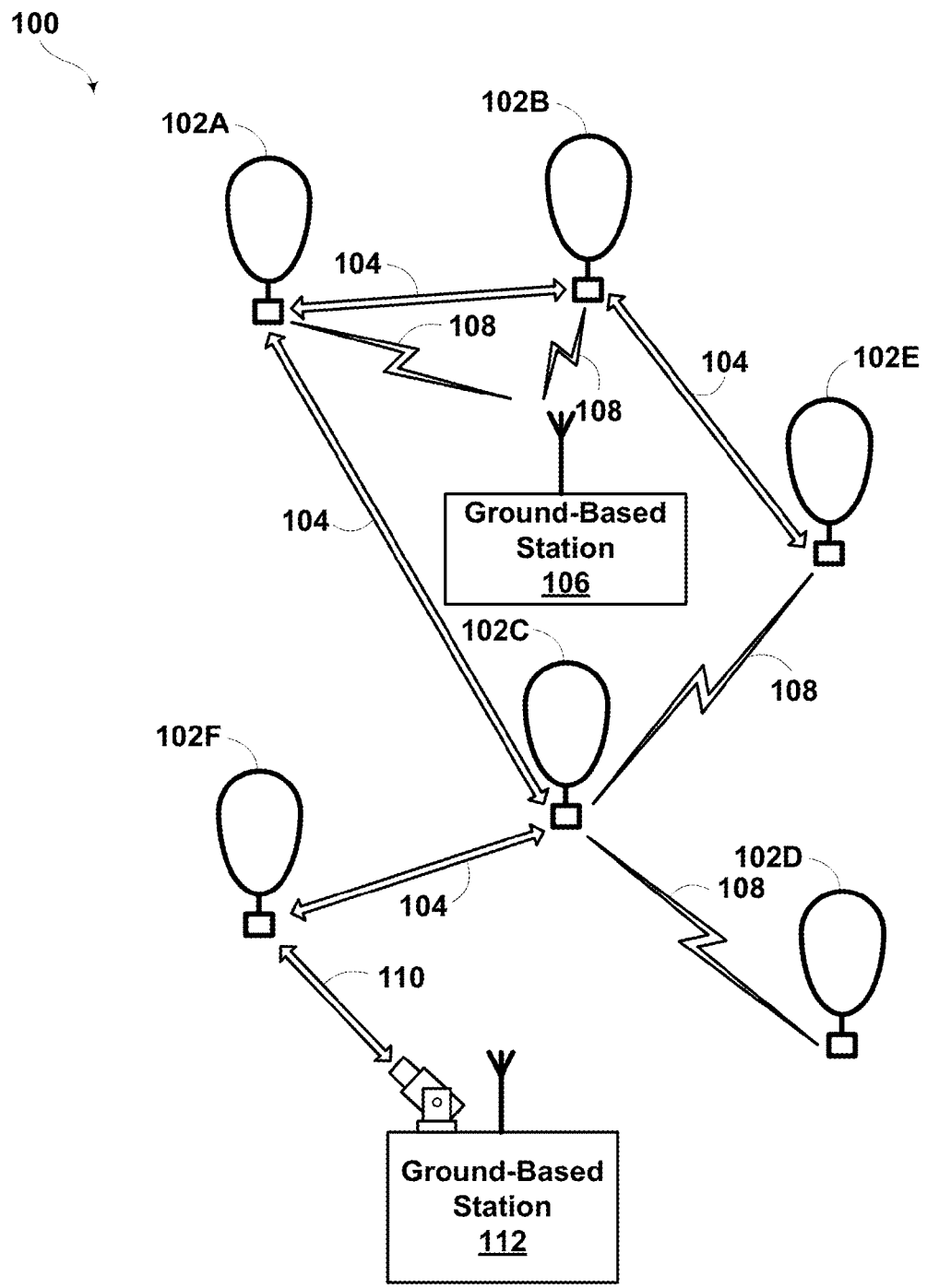
FIG. 1 is a block diagram illustrating an example balloon network.

Examples of methods and systems are described herein. It should be understood that the words "example" and "exemplary" are used herein to mean "serving as an example, instance, or illustration." Any embodiment or feature described herein as "exemplary" is not necessarily to be construed as preferred or advantageous over other embodiments or features. The example or exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Example systems and methods allow for a communication system of a balloon, such as a high-altitude balloon operating as part of a balloon network, to switch between wide-beam and narrow-beam radio frequency (RF) communication when communicating with other balloons. In general, the beam width of a transmitted RF communication signal may be inversely proportional to the distance that the beam can reach. A narrowly focused beam (e.g., from a high-gain antenna on a balloon) may reach a longer distance, while a broader beam (e.g., from a low-gain antenna on a balloon) may spread out the power over a larger area and therefore may not be able to reach as far. Accordingly, the narrowly focused beam may be preferred when it can reach a particular target balloon because it may provide a stronger radio signal. However, when the narrowly focused beam cannot reach a particular target balloon, a wider beam may be used instead.

The determination as to whether to use the wide beam or the narrow beam to transmit an RF communication signal to a particular target balloon may be based on a vertical angle between the two balloons. The vertical angle between the two balloons may be the angle at which the RF signal beam must reach in order to allow for communication between the balloons. Additionally, a threshold angle may be determined indicating a maximum angle at which the narrow-beam signal can reach, possibly within some tolerance for error. If the vertical angle between two balloons is below the threshold angle, then the narrow beam may be used for communication between the balloons. If the vertical angle is not below the threshold angle, then the wide-beam signal may be used.

As an example, a balloon may be equipped to use two different antennas, each capable of transmitting an RF signal with a different beam width. The first antenna may be a high-gain antenna capable of transmitting a narrow-beam signal 360 degrees horizontally (i.e., omnidirectional across a horizontal plane) with an 8-degree vertical range. The second antenna may be a low-gain antenna capable of transmitting a wide-beam signal 360 degrees horizontally, but with a 30-degree vertical range.

The balloon may communicate with a first target balloon that is 40 km away horizontally and 1 km higher in altitude. Because the first target balloon is far away horizontally, the vertical angle resulting from the balloons being at different altitudes may be small. Accordingly, the balloon may use its high-gain antenna to transmit a narrow-beam signal to communicate with the first target balloon. However, a second target balloon that is 5 km away horizontally and 1 km higher in altitude may be outside the range of the narrow beam. Accordingly, the vertical angle between the balloon and the second target balloon may be above a threshold angle for the narrow-beam signal, and the low-gain antenna of the balloon may be used to transmit a wide-beam signal in order to communicate with the second target balloon.

In another example, multiple antennas may be connected to a single transceiver. For instance, a high-gain antenna and a low-gain antenna may be connected to separate ports of a multi-input/multi-output (MIMO) transceiver, which may be configured to combine signals from the two antennas. A MIMO transceiver on a balloon may determine antenna utilization of the high-gain antenna and the low-gain antenna for communication with a particular neighboring balloon based on the relative signal strength of wide beam RF signals and narrow beam RF signals received from the particular neighboring balloon. For example, the high-gain antenna may be used to a greater degree to communicate with balloons at longer ranges and/or smaller deviations in elevation angle. Additionally, the low-gain antenna may be used to a greater degree to communicate with balloons that are closer and/or have greater deviation in elevation angle. By combining signals from multiple antennas, a signal with greater gain may be achieved for some relative positions of the balloons. In further examples, orthogonal polarization between the antennas may be used in order to increase signal throughput. For instance, the high-gain antenna may be vertically polarized and the low-gain antenna may be horizontally polarized to provide signal de-correlation and in general, increased signal strength.

In some examples, the balloons of a network may all be operating within a certain altitude range (e.g., 10-20 km). In such a network, balloon communication systems capable of transmitting two different beam widths may be particularly advantageous. For example, if a particular target balloon is far away in horizontal distance, the vertical angle to the balloon will generally be small enough that the narrow beam (which is capable of reaching long distances) may be used. Additionally, if a different target balloon is close in horizontal distance, the vertical angle to the balloon may be large, but a wide beam may have enough signal strength to reach the balloon because the balloon generally won't be too far away.

In additional examples, a balloon's communication system may be capable of transmitting signals with more than two beam widths. For instance, the balloon may be capable of sending signals with three or more beam widths. Each beam width may be assigned a corresponding vertical angle range, where a particular beam width is capable of reaching balloons within the corresponding vertical angle range. In some examples, each vertical angle may be assigned to the smallest available beam width that can reach balloons at the angle. Then, for a balloon to communicate with a balloon at a particular vertical angle, a beam width may be selected such that the particular vertical angle falls within the beam width's assigned angle range. In further examples, ranges may be assigned so that they don't overlap and cover as much of the surrounding space as practicable.

Example systems and methods therefore may allow for RF communication between balloons using two or more different beam widths. A balloon may switch between using different beam widths depending on the vertical angle to a particular target balloon.

II. Example Balloon Networks

In order that the balloons can provide a reliable data network in the stratosphere, where winds may affect the locations of the various balloons in an asymmetrical manner, the balloons in an exemplary network may be configured move latitudinally and/or longitudinally relative to one another by adjusting their respective altitudes, such that the wind carries the respective balloons to the respectively desired locations.

Further, in an exemplary balloon network, the balloons may communicate with one another using free-space optical communications. For instance, the balloons may be configured for optical communications using ultrabright LEDs or possibly lasers for optical signaling (although regulations for laser communications may restrict laser usage). In addition, the balloons may communicate with ground-based station(s) using radio-frequency (RF) communications.

In some embodiments, a high-altitude-balloon network may be homogenous. More specifically, in a homogenous high-altitude-balloon network, each balloon is configured to communicate with nearby balloons via free-space optical links. Further, some or all of the balloons in such a network, may also be configured communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. (Note also that some balloons may be configured to function as both a super-node and a sub-node.)

In such a configuration, the super-node balloons may be configured to communicate with nearby super-node balloons via free-space optical links. However, the sub-node balloons may not be configured for free-space optical communication, and may instead be configured for, e.g., RF communications. Accordingly, a super-node may be further configured to communicate with nearby sub-nodes using RF communications. The sub-nodes may accordingly relay communications from the super-nodes to ground-based station(s) using RF communications. Configured as such, the super-nodes may collectively function as backhaul for the balloon network, while the sub-nodes function to relay communications from the super-nodes to ground-based stations.

FIG. 1 is a simplified block diagram illustrating a balloon network 100, according to an exemplary embodiment. As shown, balloon network 100 includes balloons 102A to 102E, which are configured to communicate with one another via free-space optical links 104. Configured as such, balloons 102A to 102E may collectively function as a mesh network for packet-data communications. Further, balloons 102A to 102D may be configured for RF communications with ground-based stations 106 via RF links 108.

In an exemplary embodiment, balloons 102A to 102E are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102E may generally be configured to operate at altitudes between 17 km and 22 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 22 km may vary with latitude and by season, the variations can be modeled in a reasonably accurate manner. Additionally, altitudes above 17 km are typically above the maximum flight level designated for commercial air traffic. Therefore, interference with commercial flights is not a concern when balloons are deployed between 17 km and 22 km.

To transmit data to another balloon, a given balloon 102A to 102E may be configured to transmit an optical signal via an optical link 104. In an exemplary embodiment, a given balloon 102A to 102E may use one or more high-power light-emitting diodes (LEDs) to transmit an optical signal. Alternatively, some or all of balloons 102A to 102E may include laser systems for free-space optical communications over optical links 104. Other types of free-space optical communication are possible. Further, In order to receive an optical signal from another balloon via an optical link 104, a given balloon 102A to 102E may include one or more optical receivers. Additional details of balloons implementations are discussed in greater detail below, with reference to FIG. 3.

In a further aspect, balloons 102A to 102D may utilize one or more of various different RF air-interface protocols for communication ground-based stations 106 via RF links 108. For instance, some or all of balloons 102A to 102D may be configured to communicate with ground-based stations 106 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 108 do not provide a desired link capacity for balloon-to-ground communications. For instance, increased capacity may be desirable to provide backhaul links from a ground-based gateway, and in other scenarios as well. Accordingly, an exemplary network may also include downlink balloons, which provide a high-capacity air-to-ground link.

For example, in balloon network 100, balloon 102E is configured as a downlink balloon. Like other balloons in an exemplary network, a downlink balloon 102E may be operable for optical communication with other balloons via optical links 104. However, a downlink balloon 102E may also be configured for free-space optical communication with a ground-based station 112 via an optical link 110. Optical link 110 may therefore serve as a high-capacity link (as compared to an RF link 108) between the balloon network 100 and a ground-based station 108.

Note that in some implementations, a downlink balloon 102E may additionally be operable for RF communication with ground-based stations 106. In other cases, a downlink balloon 102E may only use an optical link for balloon-to-ground communications. Further, while the arrangement shown in FIG. 1 includes just one downlink balloon 102E, an exemplary balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of or in addition to a free-space optical communication system. The high-bandwidth RF communication system may take the form of an ultra-wideband system, which provides an RF link with substantially the same capacity as the optical links 104. Other forms are also possible.

Ground-based stations, such as ground-based stations 106 and/or 108, may take various forms. Generally, a ground-based station may include components such as transceivers, transmitters, and/or receivers for communication via RF links and/or optical links with a balloon network. Further, a ground-based station may use various air-interface protocols in order communicate with a balloon 102A to 102E over an RF link 108. As such, a ground-based station 106 may be configured as an access points via which various devices can connect to balloon network 100. Ground-based stations 106 may have other configurations and/or serve other purposes without departing from the scope of the invention.

Further, some ground-based stations, such as ground-based station 108, may be configured as gateways between balloon network 100 and one or more other networks. Such a ground-based station 108 may thus serve as an interface between the balloon network and the Internet, a cellular service provider's network, and/or other types of networks. Variations on this configuration and other configurations of a ground-based station 108 are also possible.

A. Mesh-Network Functionality

As noted, balloons 102A to 102E may collectively function as a mesh network. More specifically, since balloons 102A to 102E may communicate with one another using free-space optical links, the balloons may collectively function as a free-space optical mesh network.

In a mesh-network configuration, each balloon 102A to 102E may function as a node of the mesh network, which is operable to receive data direct to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

Further, in order to operate as a mesh network, balloons 102A to 102E may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102E move relative to one another and/or relative to the ground. Accordingly, an exemplary balloon network 100 may apply a mesh protocol to update the state of the network as the topology of the network changes. For example, to address the mobility of the balloons 102A to 102E, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102E may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for improving QoS may be employed when determining a lightpath. Other techniques are also possible.

B. Station-Keeping Functionality

In an exemplary embodiment, a balloon network 100 may implement station-keeping functions to help provide a desired network topology. For example, station-keeping may involve each balloon 102A to 102E maintaining and/or moving into a certain position relative to one or more other balloons in the network (and possibly in a certain position relative to the ground). As part of this process, each balloon 102A to 102E may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such case, a given balloon 102A to 102E may implement station-keeping functions to position itself at substantially the same distance (or within a certain range of distances) from adjacent balloons in the balloon network 100.

In other cases, a balloon network 100 may have a non-uniform topology. For instance, exemplary embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an exemplary balloon network may be dynamic and adaptable. In particular, station-keeping functionality of exemplary balloons may allow the balloons to adjust their respective positioning in accordance with a change in the desired topology of the network. For example, one or more balloons could move to new positions to increase or decrease the density of balloons in a given area. Further, in some embodiments, balloons may be in continuous or nearly continuous motion, and station-keeping may involve moving balloons so as to try to meet certain requirements for e.g., coverage in various areas.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

C. Control of Balloons in a Balloon Network

Figure 2:
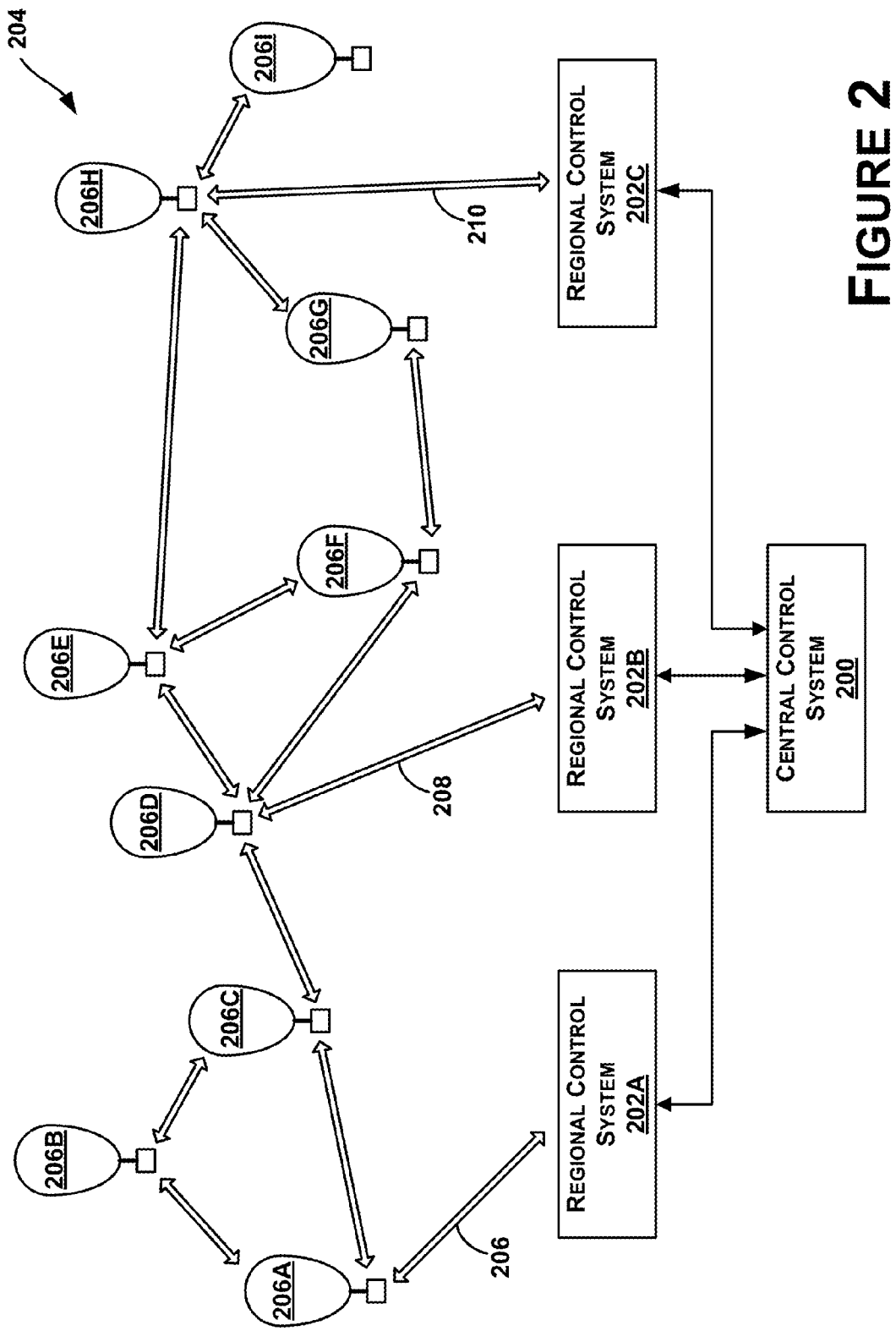
FIG. 2 is a block diagram illustrating an example balloon-network control system.

In some embodiments, mesh networking and/or station-keeping functions may be centralized. For example, FIG. 2 is a block diagram illustrating a balloon-network control system, according to an exemplary embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 204A, 204D, and 204H are configured as downlink balloons. As such, regional control systems 202A to 202C may respectively communicate with balloons 204A, 204D, and 204H via optical links 206, 208, and 210, respectively.

In the illustrated configuration, where only some of balloons 206A to 206I are configured as downlink balloons, the balloons 206A, 206D, and 206H that are configured as downlink balloons may function to relay communications from central control system 200 to other balloons in the balloon network, such as balloons 206B, 206C, 206E to 206G, and 206I. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202B may in fact just be particular type of ground-based station that is configured to communicate with downlink balloons (e.g., such as ground-based station 112 of FIG. 1). Thus, while not shown in FIG. 2, the control system shown in FIG. 2 may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

As noted, FIG. 2 shows a distributed-control arrangement, with regional control systems 202A to 202C coordinating communications between a central control system 200 and a balloon network 204. Such an arrangement may be useful in a balloon network that covers a large geographic area. In some embodiments, a distributed control system may even support a global balloon network that provides coverage everywhere on earth. Of course, a distributed-control arrangement may be useful in other scenarios as well.

Further, it should be understood that other control-system arrangements are possible. For instance, some implementations may involve a distributed control system with additional layers (e.g., sub-region systems within the regional control systems, and so on). Alternatively, control functions may be provided by a single, centralized, control system, which communicates directly with one or more downlink balloons.

In a further aspect, control and coordination of a balloon network may be shared between a ground-based control system and a balloon network to varying degrees, depending upon the implementation. In fact, in some embodiments, there may be no ground-based control system. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

D. Illustrative Balloon Configurations

Figure 3:
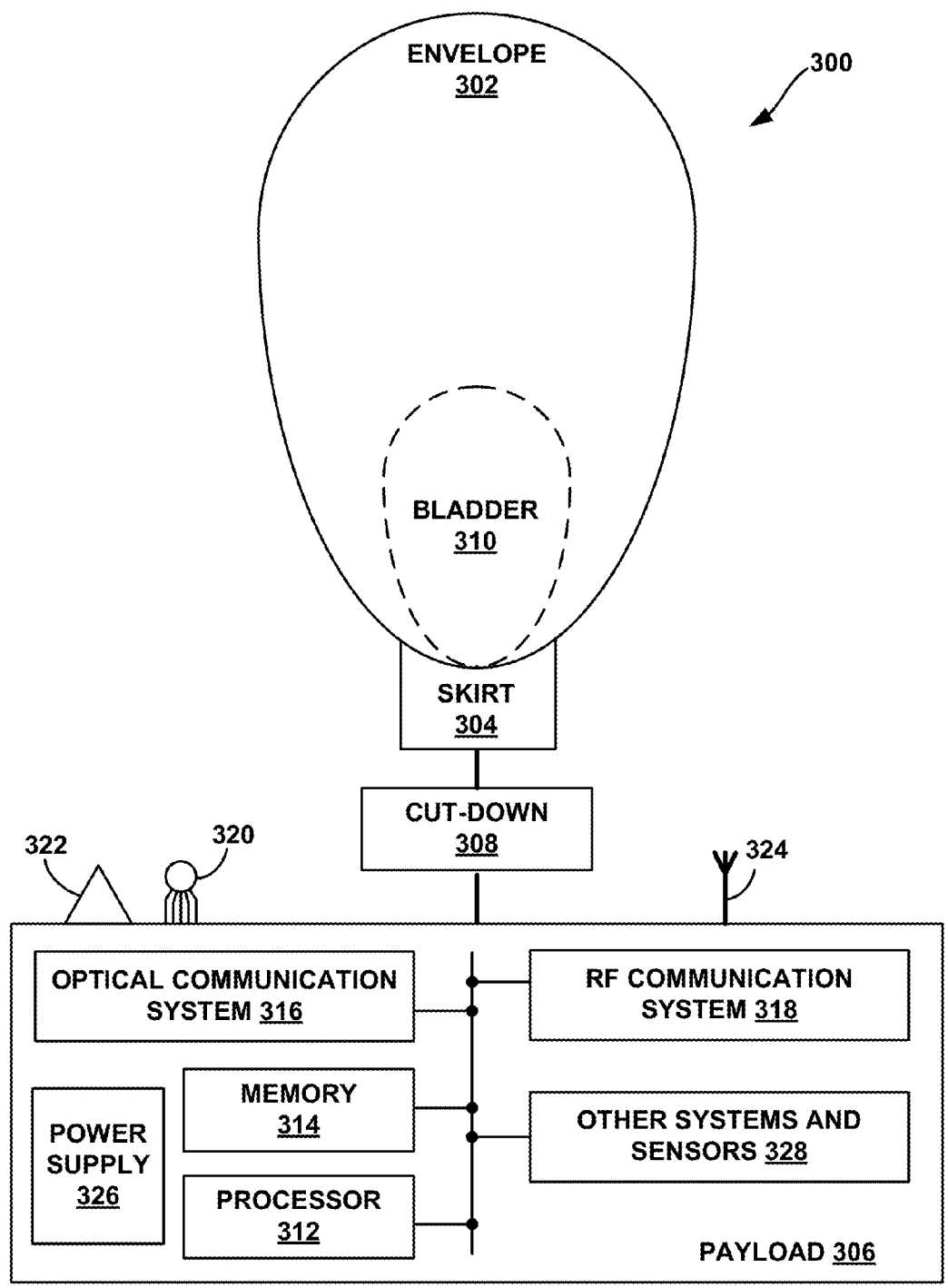
FIG. 3 shows a high-altitude balloon according to an example embodiment.

Various types of balloon systems may be incorporated in an exemplary balloon network. As noted above, an exemplary embodiment may utilize high-altitude balloons, which typically operate in an altitude range between 17 km and 22 km. FIG. 3 is a simplified block diagram illustrating a high-altitude balloon 300, according to an exemplary embodiment. As shown, the balloon 300 includes an envelope 302, a skirt 304, a payload 306, and a cut-down system 308 that is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photo-diode receiver system). Further, payload 306 may include an RF communication system 318, which may transmit and/or receive RF communications via an antenna system 324. The payload 306 may also include a power supply 326 to supply power to the various components of balloon 300.

Further, payload 306 may include various types of other systems and sensors 328. For example, payload 306 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 306 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow air to escape from bladder 310.

Further, the balloon 300 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground.

Note that movement and locations of balloons, such as balloon 300, can vary since winds in the stratosphere may affect the locations of the balloons in a differential manner. A balloon in an example network may be configured to change its horizontal position by adjusting its vertical position (i.e., altitude). For example, by adjusting its altitude, a balloon may be able to find winds that will carry the balloon horizontally (e.g., latitudinally and/or longitudinally) to a desired horizontal location. Wind speed and/or direction may vary with altitude, and since current wind velocities as well as weather forecasts are available, in principle, a balloon may be directed to a location by identifying an altitude at which a wind direction takes a balloon to along a desired trajectory. However, a balloon without other forms of propulsion may be constrained to follow the wind and there may not be a single altitude with winds taking the balloon along the desired trajectory. In addition, to control a fleet of balloons, movement of the balloons should occur from one location above the surface of the Earth to another in a predictable manner.

E. Example Heterogeneous Network

In some embodiments, a high-altitude-balloon network may include super-node balloons, which communicate with one another via optical links, as well as sub-node balloons, which communicate with super-node balloons via RF links. Generally, the optical links between super-node balloons have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
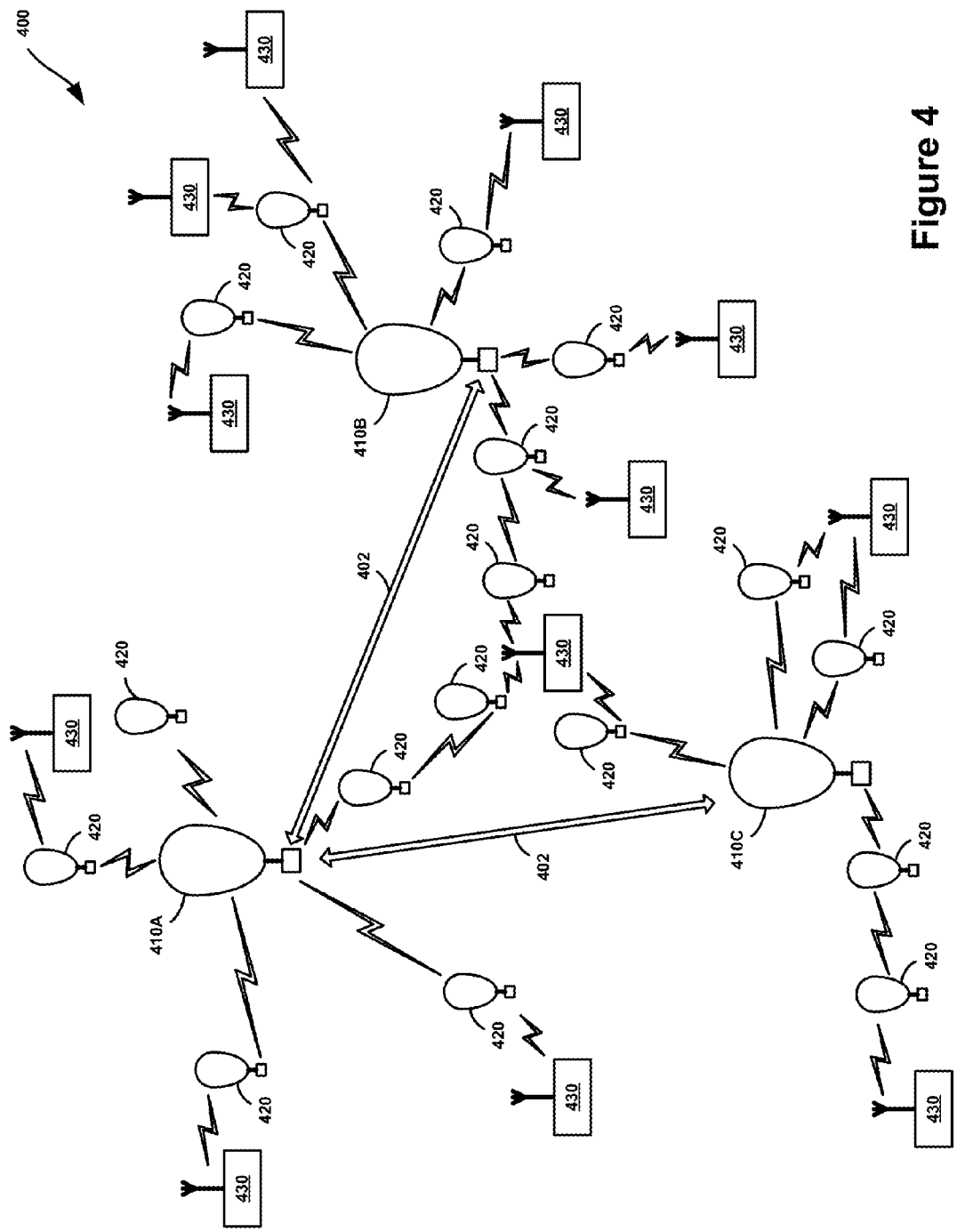
FIG. 4 is a simplified block diagram illustrating a balloon network that includes super-nodes and sub-nodes, according to an example embodiment.

FIG. 4 is a simplified block diagram illustrating a balloon network that includes super-nodes and sub-nodes, according to an exemplary embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at speeds of 10 to 50 GB/sec.

A larger number of balloons may then be configured as sub-nodes, which may communicate with ground-based Internet nodes at speeds on the order of approximately 10 MB/sec. Configured as such, the sub-nodes 420 may be configured to connect the super-nodes 410 to other networks and/or to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to balloon network 400.

III. Example Systems and Methods Involving Two Beam Widths

Figure 5:
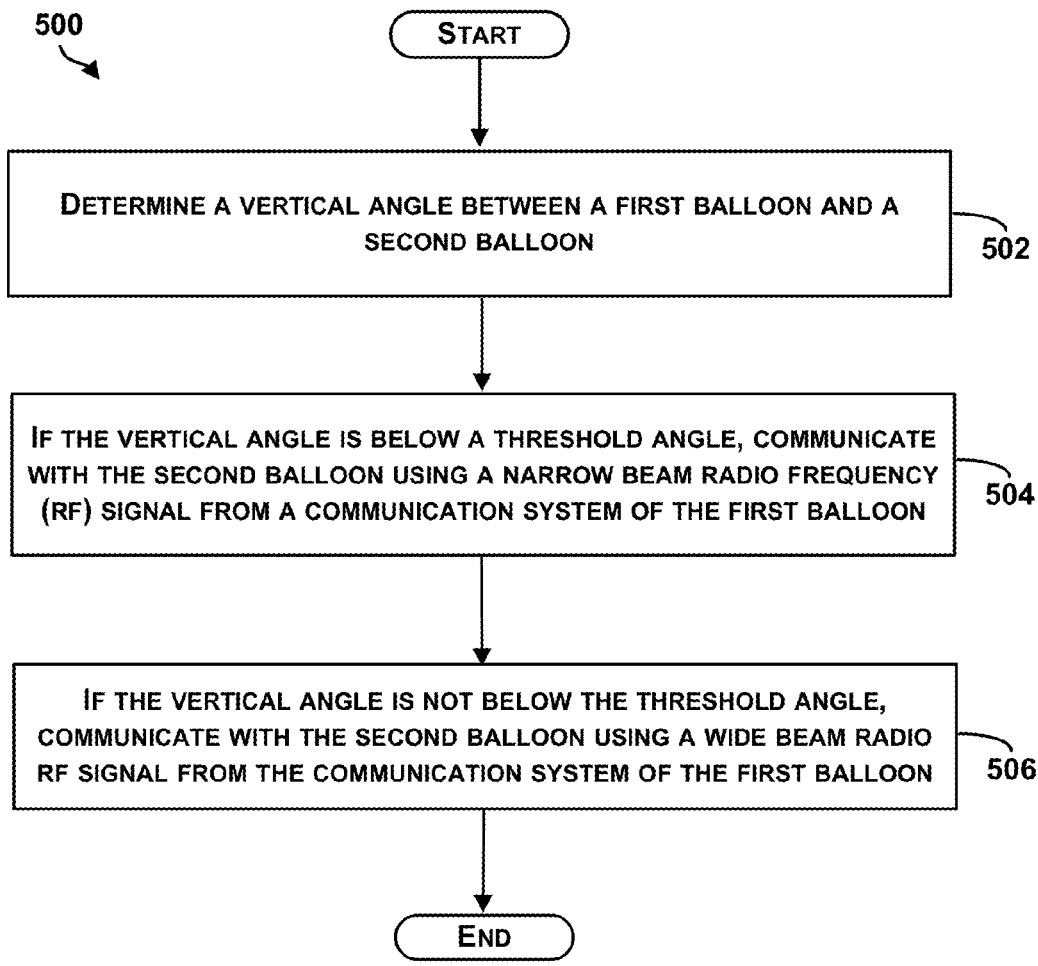
FIG. 5 is a block diagram of a method, according to an example embodiment.

FIG. 5 is a block diagram of a method, according to an example embodiment. The method 500 may be carried out by one or more computing systems located on an individual balloon and/or multiple balloons in communication with one another. In further examples, all or some of method 500 may be carried out by a control system of a balloon network. For example, some or all of method 500 may be carried out by a central control system and/or regional systems such as the ones described above with respect to FIG. 2. The control system(s) may communicate with the balloons within the balloon network. In some examples, the parts of the method 500 may be combined, separated into additional parts, and/or carried out in a different order than shown. Other configurations are also possible.

More specifically, the method 500 may initially involve determining a vertical angle between two balloons, as shown by block 502. The vertical angle between two balloons may indicate the difference in altitudes between the two balloons relative to a horizontal plane (e.g., a plane parallel to the plane that is tangential to the curvature of the Earth). In some examples, the vertical angle may be measured based on the point or points on the balloons from which the balloons are capable of transmitting and/or receiving radio frequency (RF) communication signals. For instance, the vertical angle may be measured between the position of an RF antenna on a first balloon and the position of an RF antenna on the second balloon.

Figure 6A:
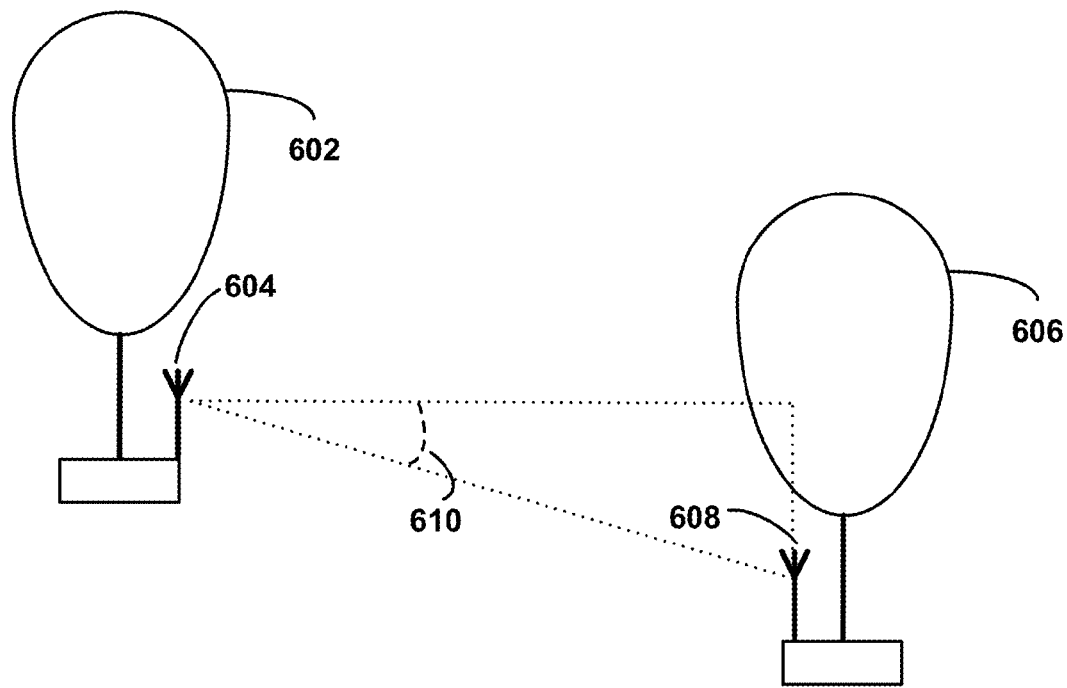
FIG. 6A illustrates a vertical angle between a first balloon and a second balloon, according to an example embodiment.

FIG. 6A shows a configuration of two balloons, according to an example embodiment. More specifically, FIG. 6A shows a first balloon 602 containing a communication system with an RF antenna 604 and a second balloon 606 containing a communication system with an RF antenna 608. A vertical angle 610 may be determined by measuring an angle between the RF antenna 604 on the first balloon 602 and the RF antenna 608 on the second balloon 606, for example. In some examples, the vertical angle 610 may be determined in other ways as well. For instance, the vertical angle 610 may be determined by first measuring a difference in altitude between the two balloons and a horizontal distance between the two balloons, and then solving the trigonometry problem to find the angular distance between communication systems of the two balloons.

In further examples, one or both of the balloons may contain communication systems with separate RF antennas located at multiple points. In such examples, separate vertical angles may be determined for each possible pair of antennas (one from each balloon) that could be used for balloon-to-balloon communication. In other examples, the difference in position between separate RF antennas on a balloon may be small enough relative to the distance between balloons that only a single vertical angle between the balloons may be measured. For instance, it may be sufficient to measure a vertical angle between the payload of the first balloon 602 and the payload of the second balloon 606.

Method 500 may then involve comparing the vertical angle to a threshold angle, and if the vertical angle is below the threshold angle, communicating using a narrow beam RF signal, as shown by block 504. Each balloon may be equipped with an RF communication system that is operable for packet-data communication over one or more RF air interfaces. In particular, a balloon may be equipped with a communication system capable of transmitting narrow beams and wide beams for purposes of RF communication with other balloons. For example, the balloon may be equipped with a high-gain antenna capable of transmitting narrow-beam signals and a separate low-gain antenna capable of transmitting wide-beam signals.

In further examples, one or both of the high-gain antenna and the low-gain antenna may be capable of transmitting RF signals 360 degrees horizontally (e.g., omnidirectional across a horizontal plane). For instance, an example balloon may be equipped with a high-gain antenna capable of transmitting RF signals 360 degrees horizontally and 8 degrees vertically, and a low-gain antenna capable of transmitting RF signals 360 horizontally and 30 degrees vertically. In other examples, one or both of the narrow-beam and wide-beam parts of a balloon's communication system may consist of multiple sectors. For example, a balloon may be equipped with separate high-gain antennas for transmitting narrow-beam signals across four different sectors (e.g., four quadrants around the balloon horizontally) with a particular vertical angle. Other configurations of RF antennas on balloons are also possible.

The threshold angle may indicate a maximum vertical angle at which a target balloon can be reached by narrow-beam signal from a high-gain antenna of a balloon. For example, if the high-gain antenna is capable of transmitting RF beams with a 10 degree vertical beam width, the threshold angle may be set to 5 degrees given that narrow-beam signals from the antenna may be able to reach target balloons up to 5 degrees above or 5 degrees below the balloon. In other examples, some buffer may be used in determining the threshold angle so that if the balloons change position relative to one another, down time in communications between the balloons may be avoided. For example, instead of setting the threshold angle to 5 degrees, it may be set to 4 degrees to ensure that target balloons are well within range of the narrow-beam RF signals.

Figure 6B:
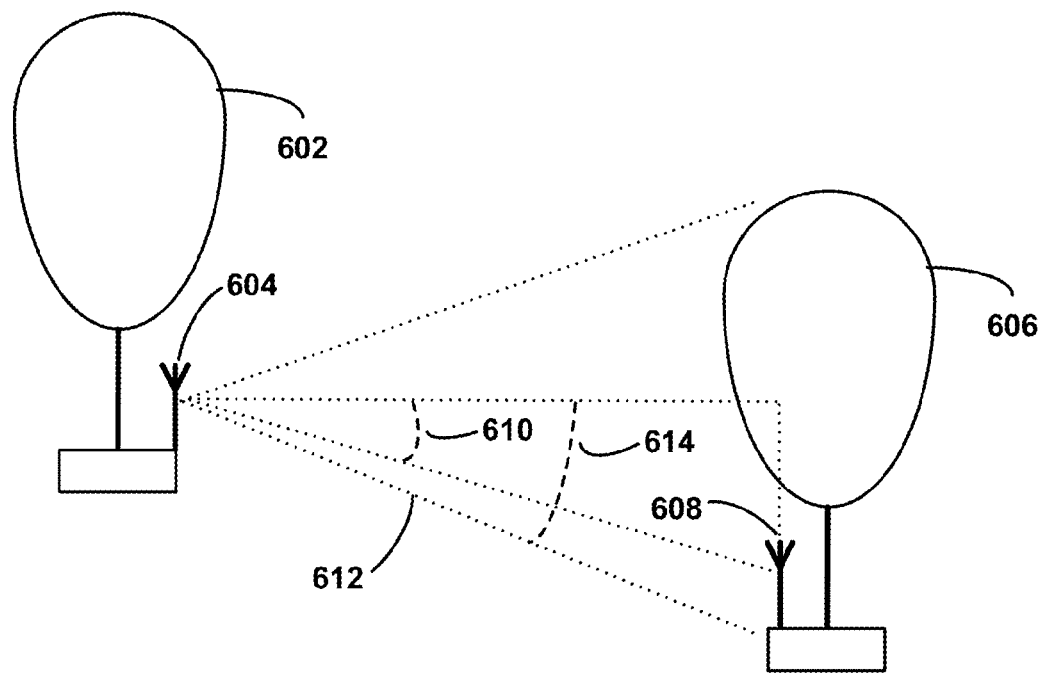
FIG. 6B illustrates communication between a first balloon and a second balloon using a first beam width, according to an example embodiment.

FIG. 6B shows another configuration of two balloons, according to an example embodiment. More specifically, FIG. 6B shows an example vertical angle 610 between two balloons 602 and 606 (or between communication systems of the two balloons as described above) that is less than a threshold angle 614 of a narrow-beam signal 612 transmitted by an RF antenna 604 on the first balloon 602. The RF antenna 604 on the first balloon 602 may be capable of transmitting a narrow-beam RF signal 612 with a certain vertical beam width. A threshold angle 614 may be determined indicating a vertical angle above or below the first balloon 602 within which a second balloon 606 can be reached by the narrow-beam RF signal 612 from the antenna 604 on the first balloon 602. After determining a vertical angle 610 between the two balloons 602 and 606, the vertical angle 610 may then be compared to the threshold angle 614. In this example, because the vertical angle 610 is less than the threshold angle 614, the RF antenna 604 of the first balloon 602 may be used to communicate with the RF antenna 608 of the second balloon 606 by transmitting the narrow-beam signal 612.

Method 500 may additionally involve communicating using a wide-beam RF signal if the vertical angle is not less than the threshold angle, as shown by block 504. As noted previously, a communication system of a balloon may be capable of transmitting both narrow-beam and wide-beam RF signals to communicate with other balloons. For example, the balloon may contain both a high-gain antenna for transmitting narrow-beam signals and a low-gain antenna for transmitting wide-beam signals. In cases where the narrow-beam signals may not be able to reach a particular target balloon, a wide-beam signal may be used for communication with that target balloon.

Figure 6C:
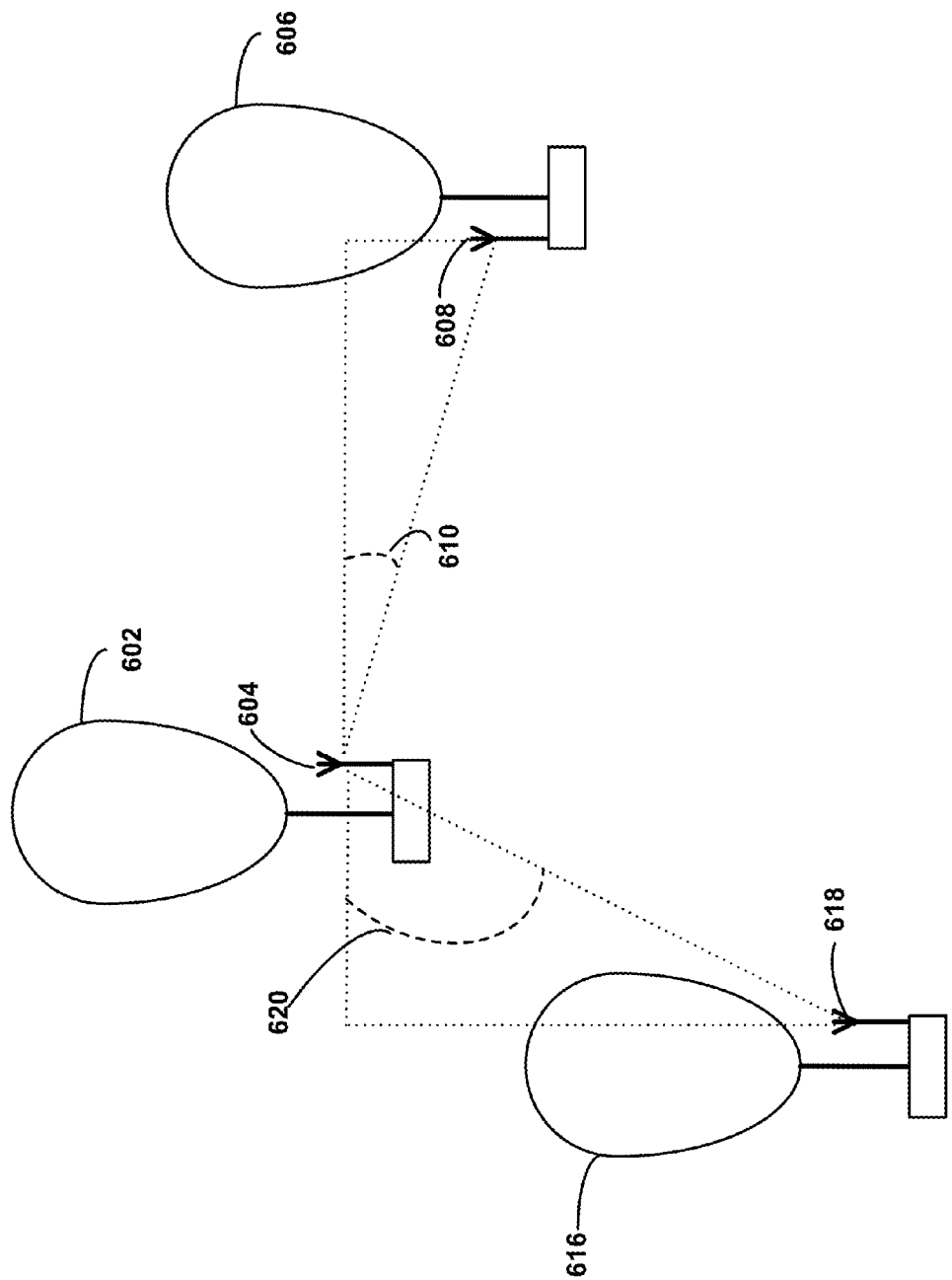
FIG. 6C illustrates vertical angles between a first balloon and two other balloons, according to an example embodiment.

FIG. 6C shows a configuration of three balloons, according to an example embodiment. More specifically, FIG. 6C shows a vertical angle 610 between a first balloon 602 and a second balloon 606, and a second bigger vertical angle 620 between the first balloon 602 and a third balloon 616. For instance, the vertical angle 610 may be measured between an RF antenna 604 on the first balloon 602 and an RF antenna 608 on the second balloon 606. Additionally, the vertical angle 620 may be measured between the same RF antenna 604 on the first balloon 602 and the RF antenna 618 on a third balloon 616. In other examples, the vertical angles may be measured between different points on the balloons as well.

The vertical angles 610 and 620 may then each be compared to a threshold angle for the RF antenna 604 on the first balloon 602. In this example, it may be determined that the vertical angle 610 between the first balloon 602 and the second balloon 606 is less than the threshold angle for the RF antenna 604. Accordingly, the RF antenna 604 may be used communicate with the RF antenna 608 on the second balloon 606. Additionally, it may be determined that the vertical angle 620 between the first balloon 602 and the third balloon 616 is greater than the threshold angle for the RF antenna 604. Accordingly, it may not be possible for the RF antenna 604 on the first balloon 602 to communicate with the RF antenna 618 on the third balloon 616. In such circumstance, a separate wide-beam RF signal may be used in order for the first balloon 602 to communicate with the third balloon 616.

Figure 6D:
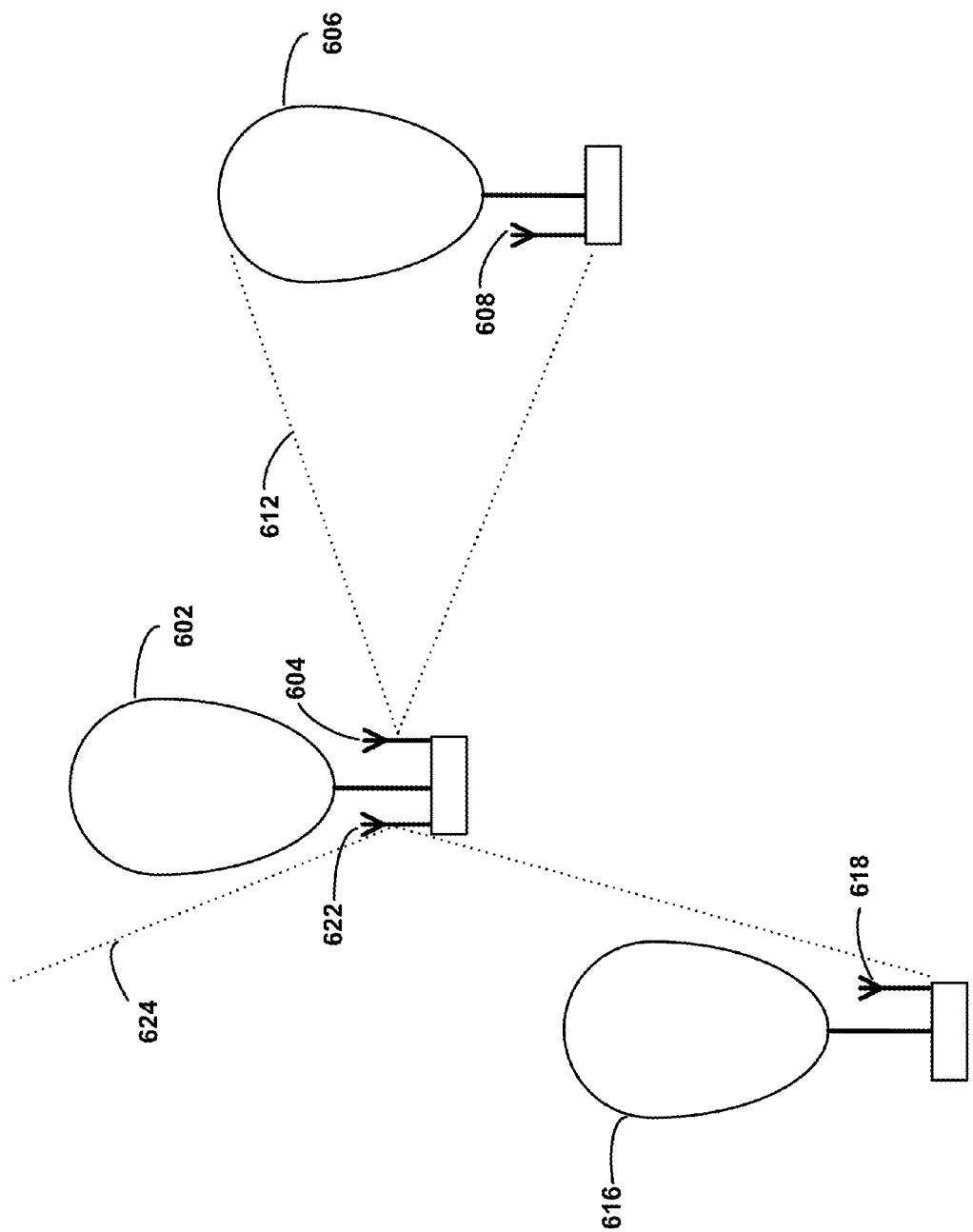
FIG. 6D illustrates communication between a first balloon and two other balloons using two different beam widths, according to an example embodiment.

FIG. 6D shows another configuration of the three balloons, according to an example embodiment. More specifically, FIG. 6D shows communication from the first balloon 602 to the second balloon 606 using a narrow-beam RF signal 612 transmitted by a high-gain antenna 604 on the first balloon 602. Additionally, FIG. 6D shows communication from the first balloon 602 to the third balloon 616 using a separate wide-beam RF signal 624 transmitted by a low-gain antenna 622 on the first balloon 602.

In further examples, a balloon could communicate with more than two other balloons at the same time. For example, a balloon could use its high-gain antenna to communicate with several balloons within range of the narrow-beam signal transmitted by the high-gain antenna, and the balloon could also use its low-gain antenna to transmit a wide-beam signal to communicate with several other balloons currently outside the range of the narrow-beam signal.

In additional examples, the vertical angle from the balloon to other neighbouring balloons may periodically be updated or recalculated. The balloon may then switch between using a wide-beam signal and a narrow-beam signal for a particular neighbouring balloon as the vertical angle to that balloon changes over time. For instance, referring back to FIG. 6D, if the altitude of the third balloon 616 increases such that the angle 620 between the first balloon 602 and the third balloon 616 falls below the threshold angle for the high-gain antenna 604 on the first balloon 602, then the first balloon 602 may switch to using a narrow-beam signal from the high-gain antenna 604 to communicate with the third balloon 616 as well.

In other examples, multiple antennas capable of transmitting signals with different beam widths may be connected to a common transceiver. For instance, a high-gain antenna (e.g., an antenna with a vertical range of 8 degrees) and a low-gain antenna (e.g., an antenna with a vertical range of 30 degrees) may both be connected to a single transceiver, such as a multi-input/multi-output (MIMO) transceiver, which may be configured to combine signals from the two antennas. By combining signals from multiple antennas, a signal with greater throughput may be achieved in some examples.

The MIMO transceiver may determine antenna utilization levels for each of two or more different antennas for communication with a particular target balloon. The transceiver may assign antenna utilization levels (e.g., weights) to each antenna based on the relative strength of different signals received from a neighboring balloon (e.g., signals with different beam widths sent from different antennas on the neighboring balloon). When transmitting to the neighboring balloon, the transceiver can apply the same weights to each antenna that were determined for the received signals (e.g., an open-loop system). In other examples, the transceiver can use feedback from the neighboring balloon to which it is transmitting to optimize weights (e.g., a closed-loop system). For example, the transceiver may receive feedback indicating antenna utilization used by a particular neighboring balloon and adjust its own antenna utilization accordingly.

The different antennas may therefore be utilized to a different degree depending on the relative positions of two balloons (e.g., the vertical angle between balloons and/or the distance between balloons). In some examples, only one of the antennas may be used at certain extreme states. For instance, if the vertical angle between the two balloons is large enough, only the low-gain antenna may be used in some examples. Additionally, a range of intermediate states may exist with different utilization levels for each antenna based on different relative positions of the target balloon. For instance, in some examples, the high-gain antenna may be utilized more to communicate with a target balloon as the vertical angle to the target balloon decreases and/or as the distance to the target balloon increases.

In further examples, orthogonal polarization between the antennas may be used in order to achieve greater signal throughput. For example, the high-gain antenna may be vertically polarized and the low-gain antenna may be horizontally polarized. Alternatively, the high-gain antenna may be horizontally polarized and the low-gain antenna may be vertically polarized. The orthogonal polarization between the antennas may provide de-correlation for good MIMO throughput in general, while the different beam widths and/or pattern shapes may provide different gains for communication with balloons at different distances and/or elevations.

In further example systems, balloons may be generally confined to operate within a particular altitude range, such as a 10-kilometer or 20-kilometer vertical altitude range. By operating balloons within the same general altitude range, a communication system that allows balloons to use two different beam widths may allow for a balloon to communicate effectively with any neighbouring balloons. In particular, in such a system, it may be unlikely that a neighbouring balloon is both far away in distance and in vertical angular distance. Accordingly, if a particular target balloon is far away in horizontal distance, the vertical angle to the balloon may generally be small enough that a narrow-beam signal (which may be capable of reaching long distances) may be used. Additionally, if the vertical angle to a particular target balloon is large, the distance to the balloon may generally be small enough that a wide-beam signal (which may not be capable of reaching as far) may be used to reach the balloon. A communication system with two beam widths may therefore allow a balloon to reach any neighbouring balloon within a general area when the balloons are operating with a certain altitude range. Other types of balloon network configurations may benefit from using balloons with communication systems capable of transmitting signals with different beam widths as well.

IV. Example Systems and Methods Involving More than Two Beam Widths

Figure 7:
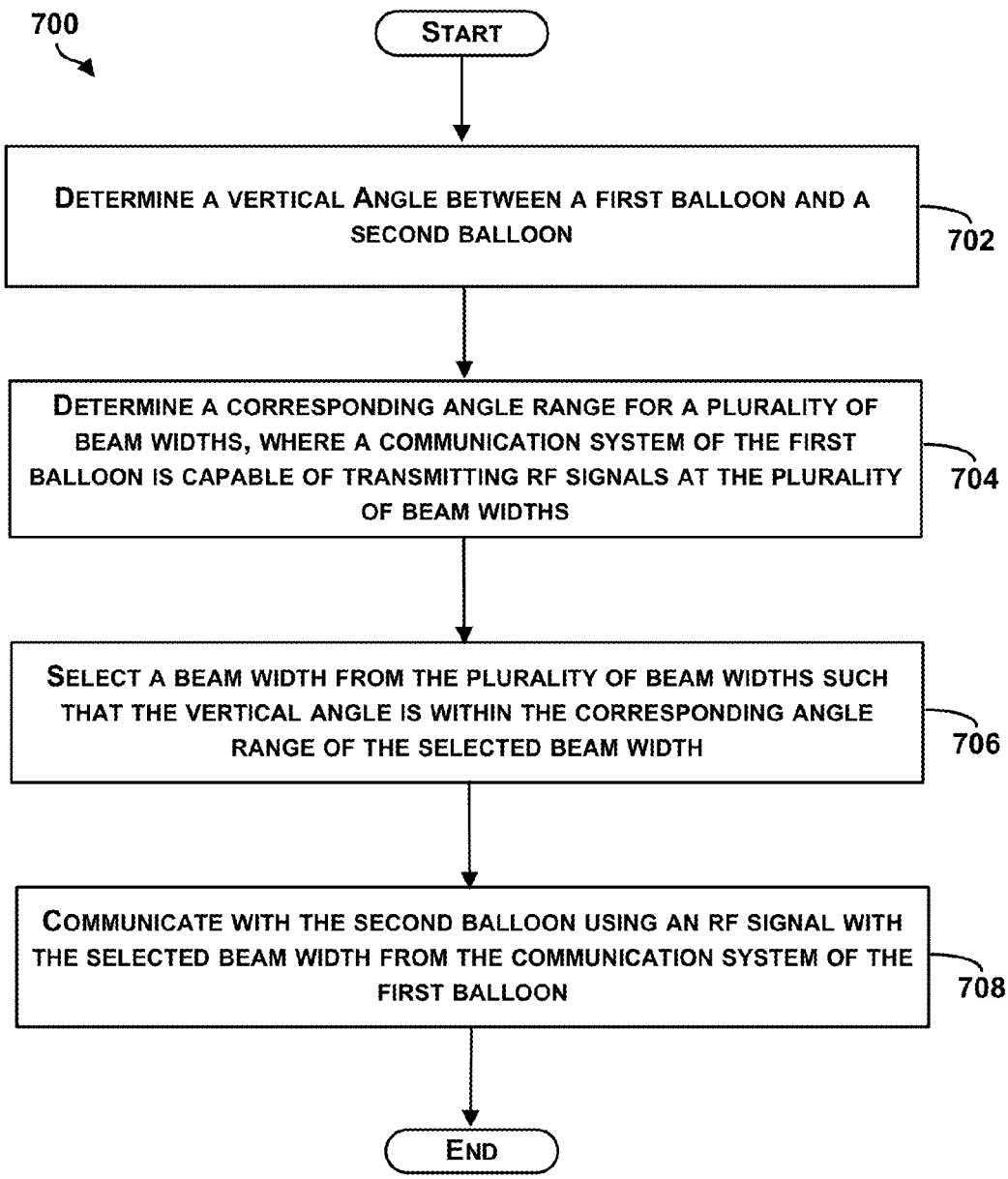
FIG. 7 is a block diagram of a method, according to an example embodiment.

Some example systems and methods may also involve balloons with communication systems capable of transmitting more than two beam widths. FIG. 7 is a block diagram of another method, according to an example embodiment. The method 700 may be carried out by one or more computing systems located on an individual balloon and/or multiple balloons in communication with one another. In further examples, all or some of method 700 may be carried out by a control system of a balloon network. For example, some or all of method 700 may be carried out by a central control system and/or regional systems such as the ones described above with respect to FIG. 2. The control system(s) may communicate with the balloons within the balloon network. In some examples, the parts of the method 700 may be combined, separated into additional parts, and/or carried out in a different order than shown. Other configurations are also possible.

Method 700 may initially involve determining a vertical angle between two balloons, as shown by block 702. In particular, the vertical angle may indicate a difference in altitude relative to a horizontal distance between the two balloons, and may be determined as described above with respect to Method 500.

Method 700 may then involve determining an angle range for each of three or more different beam widths, as shown by block 704. A communication system of a balloon may be capable of transmitting RF communication signals with three or more different beam widths. For instance, in one example, a balloon may be equipped with three different RF antennas: a high-gain antenna for transmitting narrow-beam signals, a low-gain antenna for transmitting wide-beam signals, and a medium-gain antenna for transmitting medium-beam signals with a beam width in between the narrow-beam signals and the wide-beam signals. Additional antennas may be used in some examples as well. In further examples, a single antenna may be capable of transmitting multiple different beam widths. For instance, the antenna may be capable of transmitting RF signals with one of several different discrete beam widths, or a continuously adjustable beam width instead.

An angle range may then be determined for each beam width at which the communication system can transmit RF signals. In particular, a vertical angle within the angle range for a given beam width may be assigned based on whether signals with the given beam width can reach target balloons at the vertical angle from the balloon. In some examples, a particular vertical angle may always be assigned to the smallest beam width that the balloon's communication system can transmit signals at that can also reach balloons at the particular vertical angle. Accordingly, a strongest available signal that can reach a particular target balloon may be used in order to communicate with the target balloon.

Figure 8A:
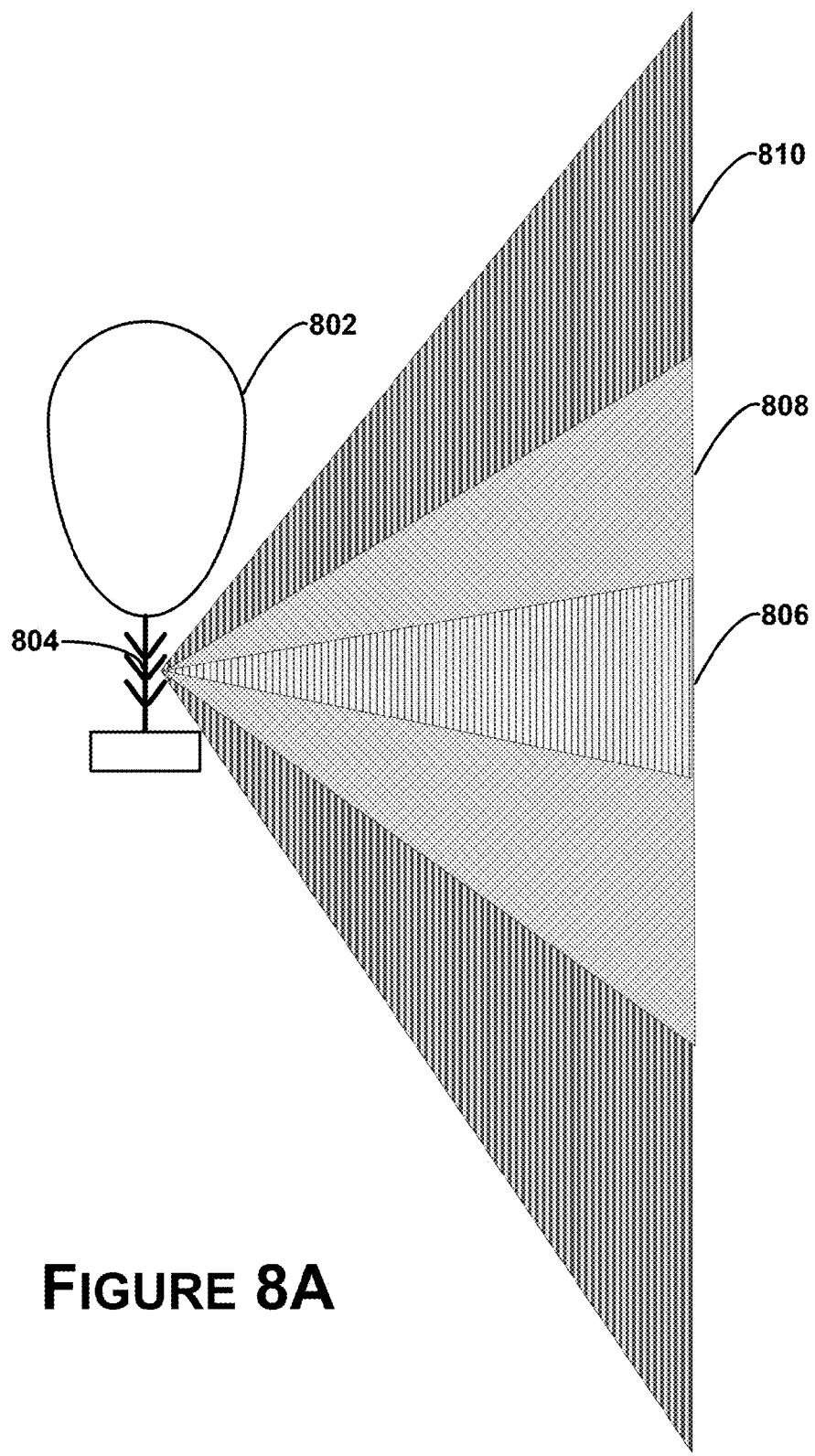
FIG. 8A illustrates a balloon capable of communicating with three different beam widths, according to an example embodiment.

FIG. 8A illustrates a balloon capable of communicating with three different beam widths, according to an example embodiment. More specifically, FIG. 8A shows a balloon 802 with a communication system 804 (which may consist of one or more RF antennas) capable of transmitting RF communication signals with three different beam widths. A first narrow beam width may be able to reach an area 806 within a particular vertical angle range from the balloon 802 (or the communication system 804 of the balloon). The narrow-beam signal may be the signal with the greatest power of the available beam widths, and may therefore be preferred when it can reach a particular target balloon. Accordingly, the angle range 806 may be assigned to the narrow beam width.

A medium beam width may be able to reach an area 808 in addition to the area 806 covered by the narrowest beam width. Because the narrower beam width may be preferred when available, the medium beam width may only be assigned the angle range that signals with the medium beam width can reach, but signals with the narrowest beam width cannot reach, which is depicted by the area 808 in FIG. 8A.

Additionally, a widest beam width may be able to reach an area 810 in addition to the areas 808 and 806 covered by the smaller beam widths. It may be preferred to use one of the more powerful narrower beam widths when they are available. Accordingly, the widest beam width may only be assigned the angle range that can only be reached by signals with the widest beam width, which is depicted by the area 810 in FIG. 8A.

Method 700 may then involve selecting a beam width that can reach a balloon at the previously determined vertical angle, as shown by block 706. More specifically, a beam width may be selected so that the vertical angle is within the assigned angle range of the selected beam width. For instance, a given vertical angle may be assigned to the narrowest beam width that can reach balloons at the given vertical angle so that the selected beam width will be the narrowest beam width that can reach a particular target balloon.

Figure 8B:
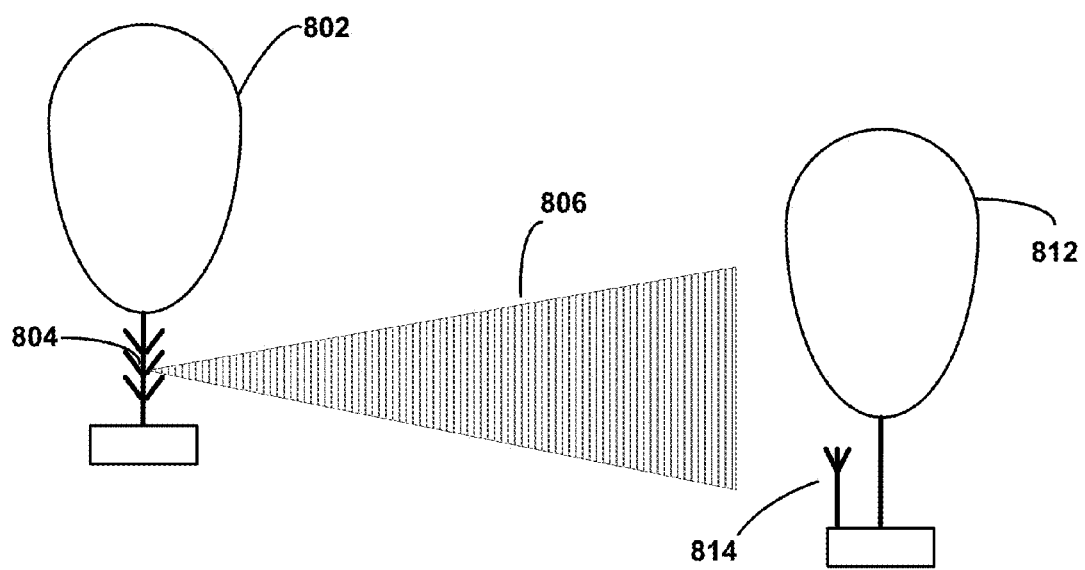
FIG. 8B illustrates the balloon from FIG. 8A communicating with a balloon using the first beam width, according to an example embodiment.

FIG. 8B shows a configuration of the balloon from FIG. 8A and another balloon, according to an example embodiment. More specifically, FIG. 8B shows the balloon 802 with a communication system 804 capable of transmitting a narrow-beam signal that can cover the area 806. It may be determined that the balloon 812 (and an RF communication antenna 814 of the balloon 812) is within range of the narrow-beam signal from the first balloon 802. In particular, the vertical angle between the first balloon 802 and the second balloon 812 may be small enough that the vertical angle falls within the assigned angle range of the narrowest beam width. Accordingly, the narrowest beam width may be selected for communication between the first balloon 802 and the second balloon 812.

Figure 8C:
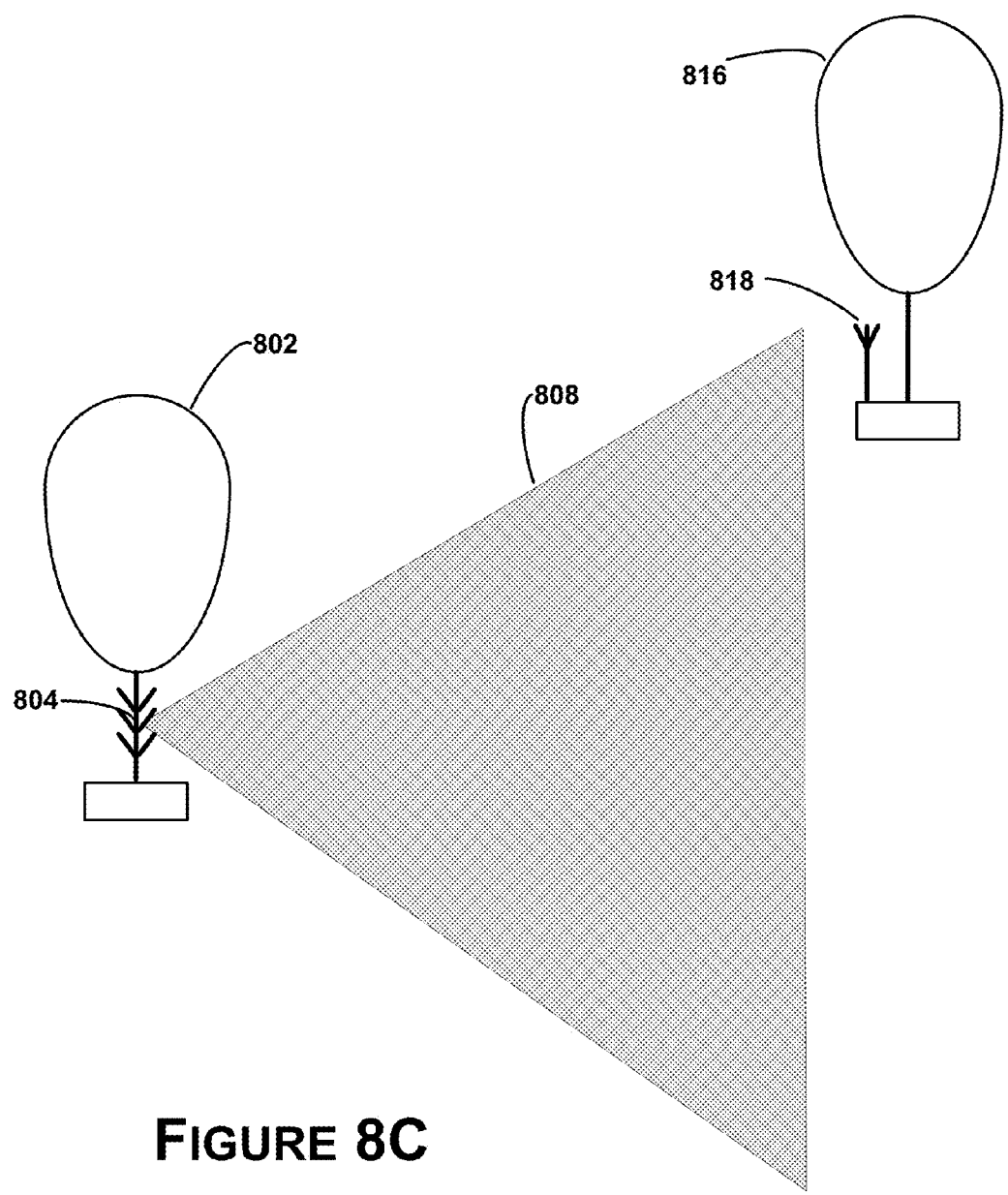
FIG. 8C illustrates the balloon from FIG. 8A communicating with a balloon using the second beam width, according to an example embodiment.

FIG. 8C shows a different configuration of the balloon from FIG. 8A and another balloon, according to an example embodiment. More specifically, FIG. 8C shows an area 808 that can be covered by the medium beam width that can be transmitted by the communication system 804 of the first balloon 802. In this example, it may be determined that the balloon 816 (and an RF communication antenna 818 of the balloon 816) is outside the range of the narrow-beam signal, but within range of the medium-beam signal from the first balloon 802. In particular, the vertical angle between the first balloon 802 and the second balloon 816 may too big to fall within the assigned angle range of the narrowest beam width, but small enough to fall within the assigned angle range of the medium beam width. Accordingly, the medium beam width may be selected for communication between the first balloon 802 and the second balloon 816.

Figure 8D:
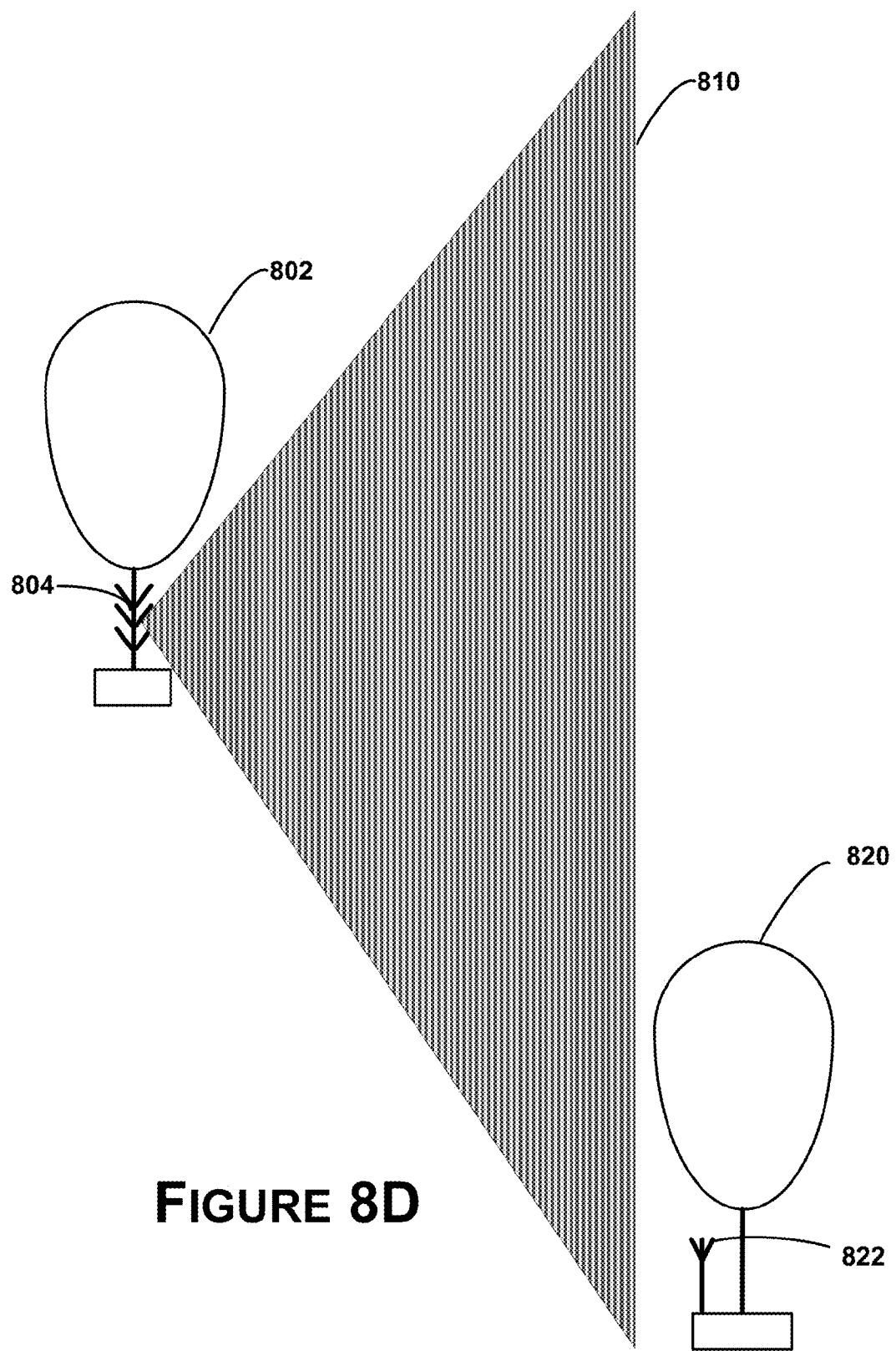
FIG. 8D illustrates the balloon from FIG. 8A communicating with a balloon using the third beam width, according to an example embodiment.

FIG. 8D shows another different configuration of the balloon from FIG. 8A and another balloon, according to an example embodiment. More specifically, FIG. 8D shows an area 810 that can be covered by the widest beam width that can be transmitted by the communication system 804 of the first balloon 802. In this example, it may be determined that the balloon 820 (and an RF communication antenna 822 of the balloon 820) is outside the range of both the narrow-beam signal and the medium-beam signal, but within range of the wide-beam signal from the first balloon 802. In particular, the vertical angle between the first balloon 802 and the second balloon 820 may too big to fall within the assigned angle range of the narrowest beam width and the medium beam width, but small enough to fall within the assigned angle range of the wide beam width. Accordingly, the wide beam width may be selected for communication between the first balloon 802 and the second balloon 820.

Method 700 may then involve communicating with the second balloon using an RF signal with selected beam width, as shown by block 708. For example, the balloon 802 from FIG. 8A-8D may communicate with balloon 812 using a narrow-beam signal, with the balloon 816 using the medium-beam signal, and with the balloon 820 using the wide-beam signal. In some examples, the balloon 802 may communicate with some or all of the other balloons simultaneously using different beam widths. Additionally, the balloon 802 may switch between beam widths for a particular target balloon when the vertical angle to the target balloon changes as one or more of the balloons move in space as well.

Other examples may involve different beam widths and/or different methods of assigning beam widths to particular vertical angles as well. For instance, a wider beam width may automatically be used as a backup for balloon-to-balloon communication when a narrow beam signal fails despite being assigned to a particular vertical angle between two balloons. In other examples, four or five or more different beam widths could be used for a single balloon communication system. Additionally, balloons may be equipped with optical communication systems in addition to RF systems in some examples as well. Such balloons may switch to and/or from optical communications in addition to switching between RF signals with different beam widths, for example. In other examples, individual balloons in the network may equipped with communication systems with different communication capabilities in some example systems as well, perhaps depending on each balloon's roles within the network.

V. Conclusion

The examples given in the preceding sections are meant for purposes of explanation and are not meant to be limiting. Other types of balloons and/or balloon networks may benefit from the disclosed systems and methods for switching between different RF communication beam widths as well, without departing from the spirit or scope of the subject matter presented herein.

Further, the above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

We claim:

1. A balloon, comprising:
an RF communication system configured to transmit radio frequency (RF) signals at a plurality of different beam widths, wherein the plurality of different beam widths comprise at least three different beam widths; and
a control system configured to:
   determine a vertical angle between the balloon and a second balloon;
   determine a corresponding angle range for each beam width of the plurality of different beam widths by determining at least three non-overlapping angle ranges;
   select a beam width from the plurality of different beam widths such that the vertical angle is within the corresponding angle range for the selected beam width; and
   communicate with the second balloon by transmitting an RF signal with the selected beam width from the RF communication system of the balloon.

2. The balloon of claim 1, wherein the control system is configured to determine the corresponding angle range for each beam width of the plurality of different beam widths by assigning a particular vertical angle to a narrowest beam width from the plurality of different beam widths that is capable of communicating with a target balloon at the particular vertical angle.

3. The balloon of claim 1, wherein the control system is further configured to operate the balloon within a certain altitude range, wherein the second balloon is operating within the certain altitude range.

4. The balloon of claim 1, wherein the control system is configured to communicate with the second balloon by transmitting the RF signal with the selected beam width 360 degrees horizontally.

5. The balloon of claim 1, wherein the control system is further configured to:
   determine vertical angles between the balloon and one or more additional balloons; and
   for the one or more additional balloons:
      select a beam width from the plurality of different beam widths such that the vertical angle is within the corresponding angle range for the selected beam width; and
      communicate with the additional balloon by transmitting an RF signal with the selected beam width from the communication system of the balloon.

6. The balloon of claim 1, wherein the control system is configured to communicate with at least two different balloons by simultaneously transmitting at least two RF signals with at least two different beam widths from the communication system of the balloon.

7. A non-transitory computer readable medium having stored therein instructions, that when executed by a computing system, cause the computing system to perform functions comprising:
   determining a vertical angle between a first balloon and a second balloon;
   determining a corresponding angle range for each of a plurality of different beam widths, wherein a communication system of the first balloon is capable of transmitting RF signals at the plurality of different beam widths, wherein the plurality of different beam widths comprise at least three different beam widths, and wherein determining the corresponding angle range for each of the plurality of different beam widths comprises determining at least three non-overlapping angle ranges;
   selecting a beam width from the plurality of different beam widths such that the vertical angle is within the corresponding angle range for the selected beam width; and
   communicating with the second balloon by transmitting an RF signal with the selected beam width from the communication system of the first balloon.

8. The non-transitory computer readable medium of claim 7, wherein determining the corresponding angle range for each of the plurality of different beam widths comprises assigning a particular vertical angle to a narrowest beam width from the plurality of different beam widths that is capable of communicating with a target balloon at the particular vertical angle.

9. The non-transitory computer readable medium of claim 7, the functions further comprising operating the first balloon within a certain altitude range, wherein the second balloon is operating within the certain altitude range.

10. The non-transitory computer readable medium of claim 7, wherein communicating with the second balloon by transmitting the RF signal with the selected beam width from the RF communication system of the first balloon comprises transmitting the RF signal with the selected beam width 360 degrees horizontally.

11. The non-transitory computer readable medium of claim 7, the functions further comprising:
   determining vertical angles between the first balloon and one or more additional balloons; and
   for the one or more additional balloons:
      selecting a beam width from the plurality of different beam widths such that the vertical angle is within the corresponding angle range for the selected beam width; and
      communicating with the additional balloon by transmitting an RF signal with the selected beam width from the communication system of the first balloon.

12. A system, comprising:
a plurality of balloons, each balloon comprising:
   an RF communication system configured to transmit radio frequency (RF) signals at a plurality of different beam widths, wherein the plurality of different beam widths comprise at least three different beam widths; and
   a control system configured to:
      determine a vertical angle between the balloon and a second balloon of the plurality of balloons;
      determine a corresponding angle range for each beam width of the plurality of different beam widths by determining at least three non-overlapping angle ranges;
      select a beam width from the plurality of different beam widths such that the vertical angle is within the corresponding angle range for the selected beam width; and
      communicate with the second balloon by transmitting an RF signal with the selected beam width from the RF communication system of the balloon.

13. The system of claim 12, wherein the control system of each balloon is configured to determine the corresponding angle range for each beam width of the plurality of different beam widths by assigning a particular vertical angle to a narrowest beam width from the plurality of different beam widths that is capable of communicating with a target balloon at the particular vertical angle.

14. The system of claim 12, wherein each of the plurality of balloons is configured to operate within an altitude range between 17 kilometers and 22 kilometers.

15. The system of claim 12, wherein the control system of each balloon is configured to communicate with the second balloon by transmitting the RF signal with the selected beam width 360 degrees horizontally.

16. The system of claim 12, wherein the control system of each balloon is further configured to:
   determine vertical angles between the balloon and one or more additional balloons of the plurality of balloons; and
   for the one or more additional balloons:
      select a beam width from the plurality of different beam widths such that the vertical angle is within the corresponding angle range for the selected beam width; and
      communicate with the additional balloon by transmitting an RF signal with the selected beam width from the communication system of the balloon.

17. The system of claim 12, wherein the control system of each balloon is configured to communicate with at least two different balloons of the plurality of balloons by simultaneously transmitting at least two RF signals with at least two different beam widths from the communication system of the balloon.

* * * * *